Nov. 29, 1938.  N. P. WORDEN  2,138,082
VEHICLE LAMP AND MOUNTING FOR THE SAME
Filed Feb. 17, 1936   3 Sheets-Sheet 2

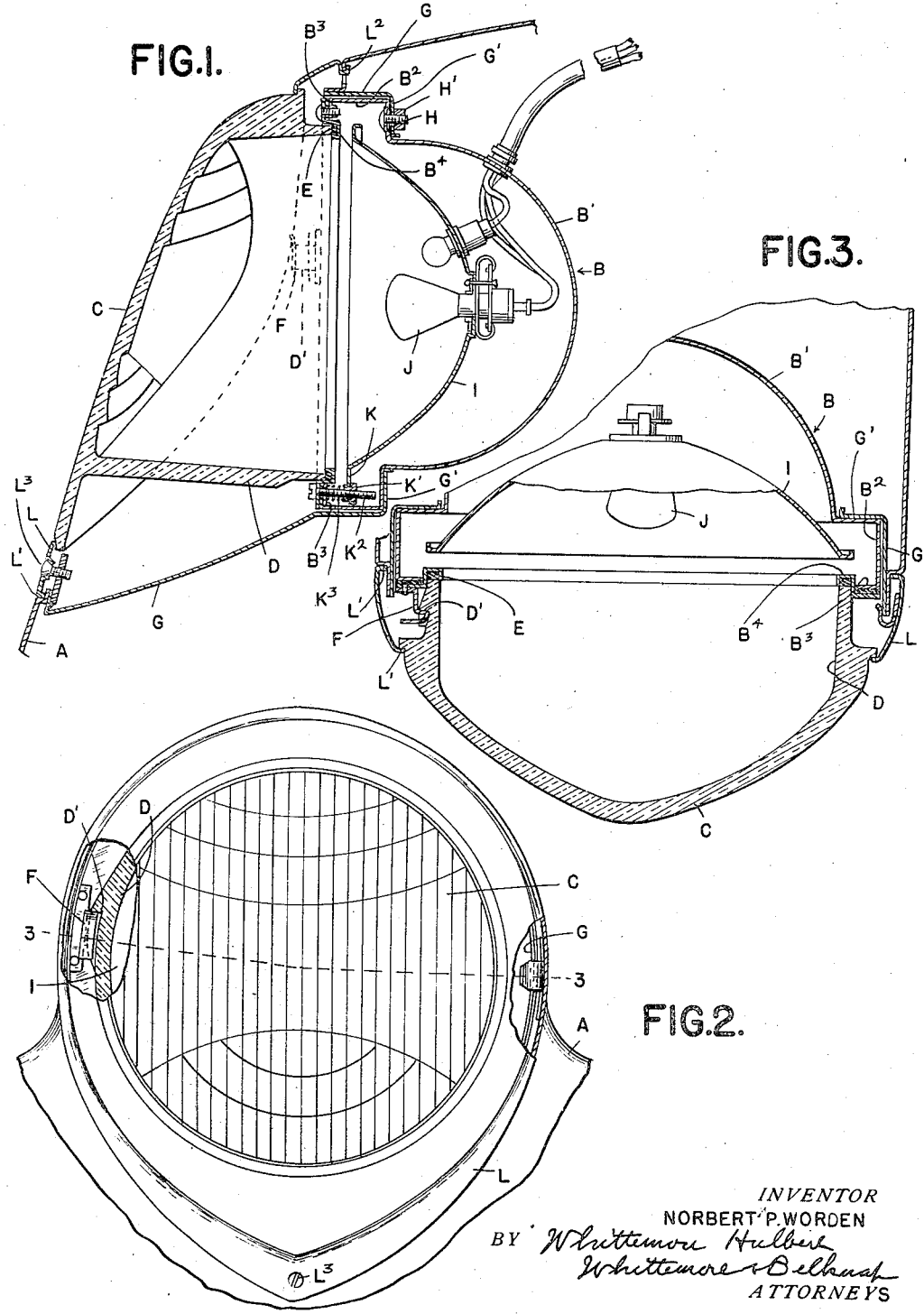

INVENTOR
NORBERT P. WORDEN
BY Whittemore Hulbert
Whittemore & Belknap
ATTORNEYS

Nov. 29, 1938.     N. P. WORDEN     2,138,082
VEHICLE LAMP AND MOUNTING FOR THE SAME
Filed Feb. 17, 1936     3 Sheets-Sheet 3
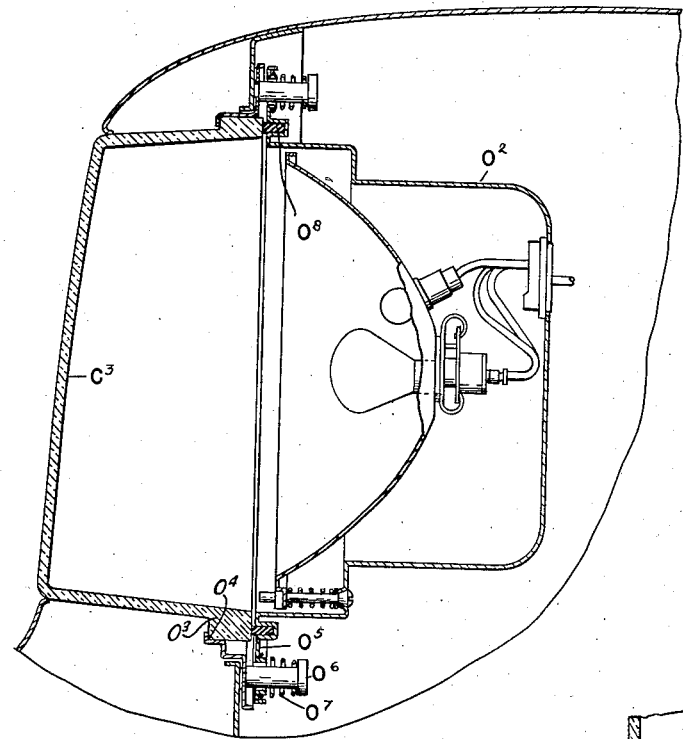
FIG.6.
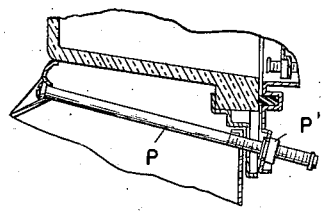
FIG.6.A
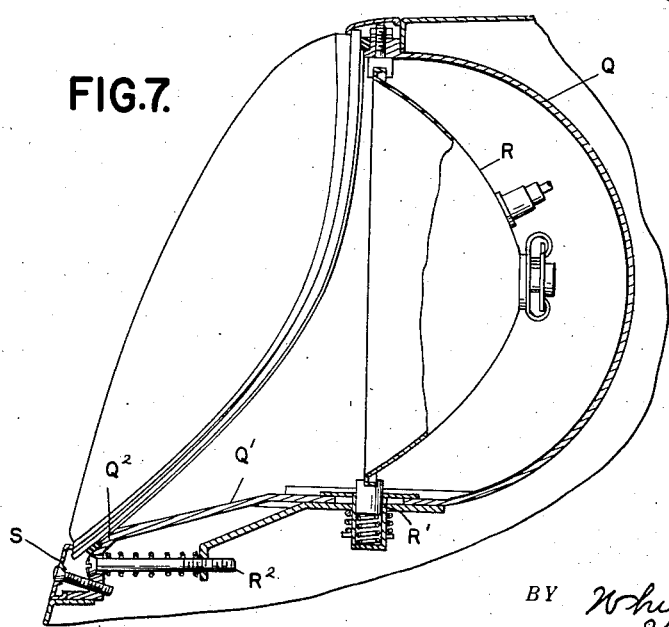
FIG.7.
INVENTOR
NORBERT P. WORDEN
BY *Whittemore Hulbert*
*Whittemore & Belknap*
ATTORNEYS Patented Nov. 29, 1938

2,138,082

UNITED STATES PATENT OFFICE 2,138,082

VEHICLE LAMP AND MOUNTING FOR THE SAME

Norbert P. Worden, Detroit, Mich., assignor to C. M. Hall Lamp Company, Detroit, Mich., a corporation of Michigan Application February 17, 1936, Serial No. 64,401

9 Claims. (Cl. 240—8.1)

The invention relates to lamps designed for use on vehicles of various types such as land and water vehicles, aircraft, etc. It is the object of the invention to obtain a construction applicable to a streamlined body without interruption of the streamlined surfaces thereof, and also a construction in which the direction of the light beam with respect to the axis of the body may be adjusted as required. To this end, the invention consists in the construction as hereinafter set forth.

In the drawings:

Figure 1 is a vertical longitudinal section through my improved lamp as mounted in a streamlined body;

Figure 2 is a front elevation thereof;

Figure 3 is a horizontal section taken on line 3—3 of Figure 2;

Figure 4:
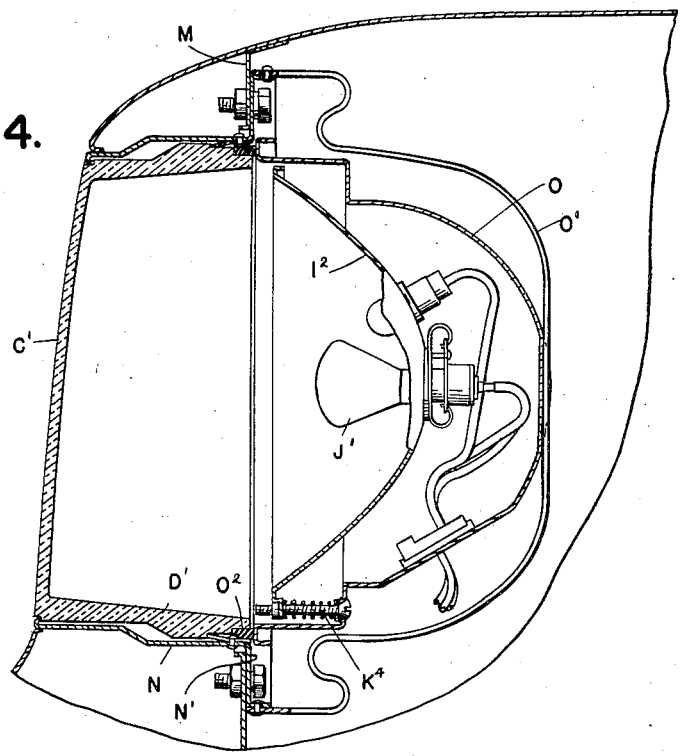

Figures 4, 5, 6, and 7 are views similar to Figure 1 showing different modifications;

Figure 6A is a cross section showing the adjustment means for the construction illustrated in Figure 6.

With the modern tendency to streamline the bodies of vehicles designed for traveling at high speed, there has also been a change in the design of headlights and other external accessories. One method of accomplishing this is to maintain the lamps in the same positions relative to the body, but to independently streamline the casings thereof. Another method is to conceal the lamp casings or portions thereof within the vehicle body. The present invention relates to this latter type and as above stated has for its object the blending of the lamp into the general streamlined contour of the body, so as to avoid any interruption in the surface thereof. It is, however, necessary that the light projecting means should be effectively sealed within a closed casing so as to preclude entrance of dust or moisture, and it is equally important to provide means for adjusting the direction of the projected light beam which means must be readily accessible.

The specific embodiment of my invention as illustrated is an automobile lamp which is incorporated in the fender with but slight variation in the design thereof and without interruption of the streamlined surface, the construction being as follows.

In the construction shown in Figure 1, A is the fender the forward portion of which curves rearwardly in an upward direction and is rounded in horizontal section. This portion is apertured to receive the lamp B and the lens C thereof is fashioned to a convex external surface forming a continuation of the fender surface. It is necessary that the optical axis of the lamp should be substantially horizontal and that the lamp casing should form a dust-proof and moisture-proof seal with the lens. This is accomplished in the construction shown in Figure 1 by providing the lens with an integral rearwardly extending barrel portion D which is concentric with the axis of the lamp but which is at an angle to the exposed outer surface of the lens. The inner end of this barrel portion D is in a plane perpendicular to its axis and is seated upon the front of the lamp casing. This casing has a semi-spherical portion B' for receiving the light projecting means and an enlarged annular portion B² at its forward end. The latter has a radial inwardly extending flange B³ terminating in a channeled portion B⁴ for receiving a gasket E. This forms a seat for the inner end of the barrel portion D and the lens and casing are detachably locked to each other, preferably by segmental flanges D' on the barrel, for rotatively engaging resilient clips F on the casing.

For mounting the lamp there is provided within the fender a pressed sheet metal member G surrounding the opening and welded or otherwise secured to the fender body. This member G has a portion G' for receiving the annular portion B² of the lamp casing and bolts or studs H on said casing project through apertures in the member G' and are secured by nuts H'. Thus, the lamp casing and lens are normally held in rigid relation to the fender.

The light projecting means comprises a parabolic reflector I and a lamp bulb J mounted at the center thereof, this bulb being preferably of the type in which a plurality of filaments are held in exactly predetermined relation to the focus of the reflector. The reflector is floatingly mounted within the lamp casing preferably by providing an outwardly extending flange K on the reflector having located at spaced points thereon nuts K' engaged by screws K². These screws are inserted through apertures in the flange B³ and helical springs K³ surround the screws K² and abut against the flanges K and B³, thus holding the heads of the screws against the flange B³. There are preferably three of the screws K² which are so distributed about the reflector that a universal adjustment of the latter may be effected.

To provide access to the screws K² for adjustment and also to permit of mounting and demounting the lens C upon the lamp casing the aperture in the fender is larger than the lens, leaving a marginal opening therearound. This is closed by a marginal frame L the inner edge of which seats upon the lens, while its outer edge engages a groove L' at the margin of the fender opening. The frame is secured in position by inwardly extending spring clips L² and a single screw L³. When removed, it provides sufficient clearance for the rotation of the lens to disengage the same from the lamp casing and also provides an opening through which, when the lens is in position, a screw driver or other tool may be inserted for adjusting the screws K².

With the modified construction shown in Figure 4, instead of mounting the lamp by inserting the same through the opening in the fender it is placed in position from the rear. Thus, as shown the fender cowl or other portion of the vehicle body has arranged within the same an annular member M which is apertured in alignment with an aperture in the front of the body. The lens C' has a rearwardly extending barrel D' which is placed within a sourrounding casing N which latter has the flange N' bolted or otherwise secured to the member M. The lamp casing O containing the light projecting means is detachably secured in position by a bail O' which clamps it against the rear side of the member M and flange N', and a gasket O² forms the seal between the casing and the barrel D'. The light projecting means includes the parabolic reflector I² and light bulb J'. These parts are floatingly mounted by screws K⁴ similar to the screws K² but adjusted from the rear.

Figure 5:
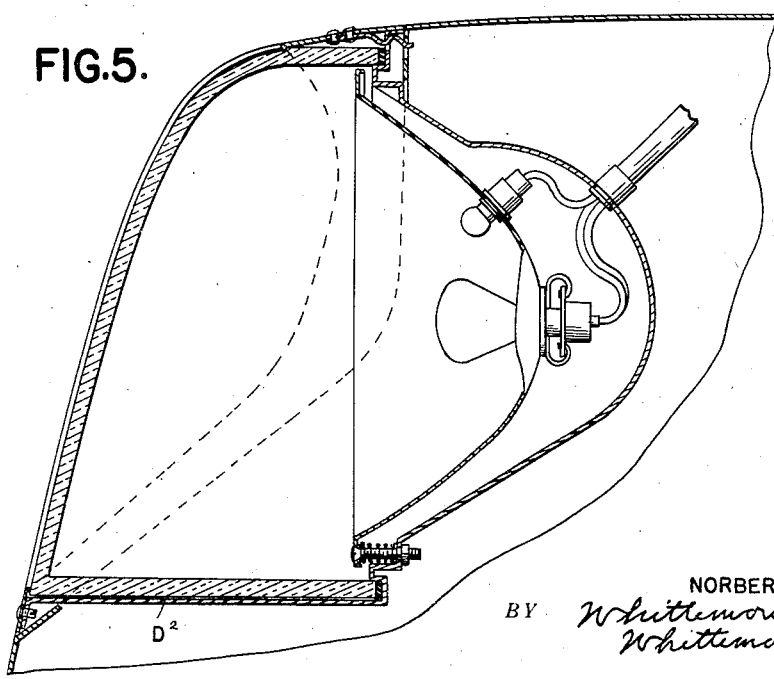

The construction shown in Figure 5 is similar to the construction shown in Figure 1, but the adjustment means for the light projector is arranged inside of the barrel D² and this necessitates the removal of the lens whenever adjustment is made but otherwise the construction is substantially the same as that previously described.

With the construction shown in Figure 6 the lamp casing O² and lens C³ are inserted from the rear similar to the construction shown in Figure 4 and the adjustment means is also operated from the rear. The lens is provided with a shoulder O³ which is seated against an annular bearing O⁴ and the casing is provided with a flange O⁵ apertured to engage stationary headed pins O⁶ having springs O⁷ sleeved thereon and bearing against said flange. A gasket O⁸ is located in a groove in said flange and a screw P operable from the front of the body and engaging the nut P' draws the flange and gasket in sealing contact with the lens.

In the modification shown in Figure 7, instead of providing the lens with a rearward extension or barrel the lamp casing Q is provided with a portion Q' which extends forward beyond the reflector and forms a seat Q² for the margin of the lens. The light projecting means includes the parabolic reflector R which is adjustable relative to the casing by suitable means such as the sliding bearing R' operated by a screw R² accessible from the front. A finishing ring S surrounding the lens conceals this adjustment mechanism.

With all of the modifications as above described, the front of the lamp forms a continuation of the streamlined surface of the body, while the light projecting means is independently adjustable so as to properly direct the beam.

What I claim as my invention is:

1. The combination with a streamlined vehicle body having an opening in a front portion thereof, of a lamp within said body, a lens for said lamp within said opening forming a continuation of the streamlined surface, the dimensions of said lens being less than those of the opening to leave a surrounding aperture, light producing and projecting means within said body, means for adjusting said light producing means operable from the front through the opening surrounding said lens, and a border frame for closing said surrounding opening also forming a continuation of the streamlined surface and concealing said adjustment means.

2. A vehicle headlight construction comprising, a cup-shaped housing having a gasket and gasket receiving ring extending inwardly from around its open end, means for securing said housing in the vehicle so that said gasket is positioned in a vertical plane, a reflector and light source disposed within said housing, a plurality of adjusting screws extending through said housing exteriorly of said gasket, said screws coacting with said reflector whereby said reflector may be tilted relative to said housing, a lens having a cylindrical sleeve molded integrally therewith, which sleeve extends horizontally from the face of the lens when the latter is positioned in a diagonal plane with the open end of said sleeve terminating in a vertical plane, and means for securing the open end of said sleeve against said gasket so as to form a closure for said housing.

3. A device, as claimed in claim 2, wherein said adjusting screws are disposed at the bottom and both sides of said reflector to thereby operably tilt the light beam from the reflector both vertically and laterally.

4. A vehicle headlight adapted to be housed within a curved portion of a vehicle body so as to carry out the contour of said curved portion, said body having a retaining flange secured within the curved portion thereof, a lamp housing adapted to be detachably secured to said flange in position horizontally aligned with an opening in said curved portion, a gasket and gasket receiving ring on said lamp housing, said ring being positioned in a vertical plane when the housing is secured to said flange, a lens adapted to coact with said gasket and form a closure for said housing, said lens having its front face curved to the contour of the adjacent portion of the body thus forming a continuation of the lines of said body over said opening and said lens having a cylindrical sleeve extending inwardly therefrom which terminates in a vertical plane, and means for securing said sleeve to said gasket.

5. A vehicle headlight, as claimed in claim 4, wherein said lens and sleeve are formed as an integral glass casting.

6. A vehicle headlight adapted to be housed within an opening in a vehicle body so as to form a closure for said opening, a retaining flange disposed within said body, a lamp housing detachably secured to said flange in position horizontally aligned with said opening, said housing having a gasket and gasket supporting ring formed thereon in a vertical position, a reflector disposed within said housing, adjusting means extending through said housing exteriorly of said gasket which coacts with said reflector so that same may be adjusted, a lens characterized by having its front face formed flush with said body with the periphery of said face spaced from the edges of said opening in the body, said lens having an annular portion which coacts with said gasket to form a closure for the lamp housing, said adjusting means being so disposed that it is accessible through the space between said lens and body, and a lens ring secured to said body around said opening which coacts with the periphery of said lens to form a closure for said adjusting means.

7. A vehicle headlight adapted to be housed within an opening in a curved portion of a vehicle body so as to carry out the contour of said curve and form a closure for said opening, a retaining flange disposed within said curved portion, a lamp housing detachably secured to said flange in position horizontally aligned with said opening, said housing having a gasket and gasket supporting ring formed thereon in a vertical position, a reflector disposed in said housing, adjusting means extending through said housing exteriorly of said gasket which coacts with said reflector so that same may be adjusted, a lens characterized by having its front face forming a continuation of said curved portion so as to carry out the curved contour of said body and having a cylindrical sleeve cast integrally therewith which extends inwardly and terminates in a vertical plane, the periphery of said front face being spaced from the edges of said opening in the body, means for securing the inner end of said sleeve in contact with said gasket to form a closure for said lamp housing, said adjusting means being so disposed that it is accessible through the space between said lens and body, and a lens ring secured around said body opening which coacts with the periphery of said lens to form a closure for said adjusting means.

8. A vehicle headlight adapted to be housed within the front fender of a vehicle, said fender having a lamp supporting sleeve extending inwardly from around an opening therein, said opening being formed in an inclined curved portion of said fender, a radially extending flange projecting inwardly from the inner end of said sleeve, a lamp housing adapted to be detachably secured to said flange, a gasket and gasket supporting ring fixed to said housing adjacent to said flange and within the lines of the sleeve, a lens adapted to coact with said gasket to form a closure for said housing, and means for securing said lens to said housing in such a position that it forms a seal with said gasket, the light transmitting portion of said lens continuing the contour of said fender and forming a closure for the opening therein.

9. The combination with a streamlined vehicle body having an opening in the front portion thereof, of a lamp casing within said body in fixed relation thereto and in alignment with said opening, a lens within said opening forming a continuation of the streamlined surface and having a sealing engagement with said casing, the dimensions of said lens being less than those of the opening to leave a surrounding aperture, light producing and projecting means within said casing, means for adjusting said light producing and projecting means operable from the front through the opening surrounding said lens and outside said sealing engagement, and a border frame for closing said surrounding opening also forming a continuation of the streamlined surface and concealing said adjusting means.

NORBERT P. WORDEN.